United States Patent Office 3,652,599
Patented Mar. 28, 1972

3,652,599
NOVEL AZIDOSULFONYLCARBANILATES
Adnan A. R. Sayigh, North Haven, Benjamin W. Tucker, Bethany, and Henri Ulrich, Northford, Conn., assignors to The Upjohn Company, Kalamazoo, Mich.
No Drawing. Filed Mar. 20, 1970, Ser. No. 15,839
Int. Cl. C07c 117/00
U.S. Cl. 260—349
6 Claims

ABSTRACT OF THE DISCLOSURE

Azidosulfonylcarbanilates are disclosed which are derived from aliphatic alcohols in which the hydrogen atom in one or more of the hydroxyl groups is replaced by an azidosulfonylphenylcarbamoyl group. The compounds have the formula:

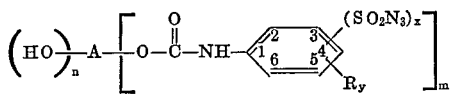

wherein A is the residue of an aliphatic alcohol having $(n+m)$ hydroxyl groups and a molecular weight of less than 300, $n$ is an integer from 0 to 5, $m$ is an nteger from 1 to 6, provided that the sum of $n+m$ is not greater than 6, R is lower-alkyl or halogen, $x$ is an integer from 1 to 2, $y$ is an integer from 0 to 2, provided that the sum of $x+y$ is not greater than 3, and the $SO_2N_3$ group is in any of positions 3, 4, or 5, one of said positions being unsubstituted. The above compounds are prepared by reacting the starting aliphatic alcohol with the appropriate proportion of the appropriately substituted isocyanatobenzenesulfonyl chloride and reacting the intermediate chlorosulfonylcarbanilate with sodium azide. The above compounds are useful as crosslinkers in a wide variety of polymer systems containing C—H bonds and are activated either photolytically or thermally.

BACKGROUND OF THE INVENTION (1) Field of the invention

This invention relates to novel azidosulfonylcarbanilates and is more particularly concerned with azidosulfonylcarbanilates derived from aliphatic alcohols and with methods for their preparation.

(2) Description of the prior art

The preparation of a number of sulfonylazides and their uses as crosslinking agents has been described hitherto; see, for example, U.S. Pats. 3,449,294; 3,453,108; 3,455,689; and 3,462,268. The known sulfonylazides, when used as crosslinking agents are activated by exposure to actinic or thermal radiation. The resulting decomposition of said sulfonylazides is frequently unpredictable and violent in nature. This phenomenon has led to extreme caution in the use of sulfonylazides as crosslinking agents. We have now found a novel class of sulfonylazides which can be used as crosslinking agents and which are free from the hazards associated with sulfonylazides hitherto known.

SUMMARY OF THE INVENTION

This invention comprises novel compounds represented by the formula:

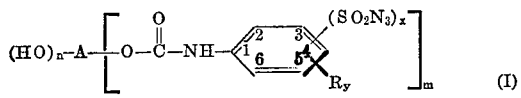

wherein A is the residue of an aliphatic alcohol having $(n+m)$ hydroxyl groups and a molecular weight of less than 300, $n$ is an integer from 0 to 5, $m$ is an integer from 1 to 6 provided that the sum of $n+m$ is not greater than 6, R is selected from the class consisting of lower-alkyl and halogen, $x$ is an integer from 1 to 2, $y$ is an integer from 0 to 2, provided that the sum of $x+y$ is not greater than 3, the $SO_2N_3$ group is in any of positions 3, 4, or 5 in the phenyl nucleus to which it is attached, and at least one of said positions 3, 4, and 5, is unsubstituted.

The term "lower-alkyl" means alkyl of from 1 to 6 carbons inclusive, such as methyl, ethyl, propyl, butyl, pentyl, hexyl, and isomeric forms thereof. The term "halogen" is employed in its generally accepted sense as embracing fluorine, chlorine, bromine and iodine.

Compounds of the invention are useful cross-linking agents in polymer systems such as, for example, polyurethane, polyolefin and like polymers containing recurring C—H bonds. In general, they may be added to various polymer systems, or, in the case of those compounds (I) having free hydroxyl groups, chemically incorporated into polymer chains. Activation of the cross-linker in the polymer is thereafter effected by photolytic and/or thermolytic means.

Methods of using polyazides and sulfonylazides as cross-linkers have been described in a number of patents as set forth above. The compounds of this invention, in general, have been found to be particularly useful cross-linkers in that they possess greater thermal stability than prior known sulfonylazide cross-linkers. Thus, the compounds (I) not only possess higher decomposition temperatures (up to 60° C. higher) than hitherto known sulfonylazides, but the decomposition takes place much more smoothly and with much less violence than in the case of sulfonylazides hitherto available. The greater thermal stability not only enables higher processing temperatures to be used in cross-linking polymers but also renders the compounds of the invention less hazardous to handle in comparison to the prior known sulfonylazide cross-linkers. The compounds (I) of the invention have been found particularly useful in the bonding together, in the form of laminates, of materials which are normally difficult to unite chemically. For example, the compounds (I) can be used to bond together layers of polyolefin sheets or to bond together different polymers such as polyolefins and polyurethanes. The compounds of the invention (I) are also useful cross-linkers in photo-resist systems. Those compounds of Formula I which contain free hydroxyl groups can be bonded to polymer surfaces which are normally hydrophobic, thereby making the treated part of the surface hydrophilic. Such use of these compounds finds particular application in the preparation of lithographic printing plates.

DETAILED DESCRIPTION OF THE INVENTION

The compounds (I) of the invention are prepared conveniently from readily available starting materials in accordance with the following scheme.

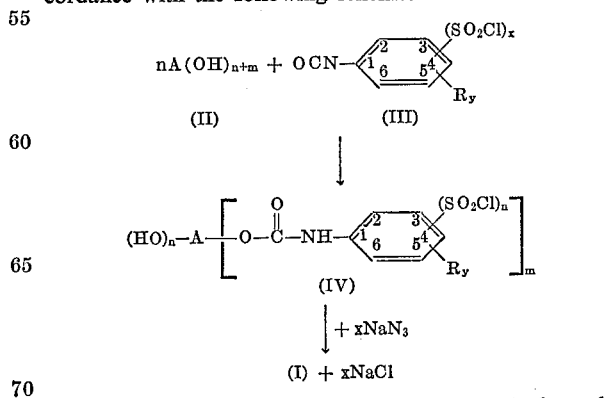

In the above reaction scheme $n$, $m$, A, R, $x$, and $y$ have the significance hereinbefore defined.

In carrying out the above reactions the alcohol (II) and appropriate isocyanatophenylsulfonyl chloride (III) are brought together under conditions well-known in the art for the reaction of alcohols and isocyanates. Advantageously, the reactants are brought together at ambient temperatures, i.e. of the order of 20° C.–25° C., in the presence of an inert organic solvent, i.e. an organic solvent which does not enter into reaction with either of the reactants or interfere in any other way with the desired course of the reaction. Examples of inert organic solvents are acetonitrile, tetrahydrofuran, dioxan and the like. The reaction of the alcohol (II) and the sulfonylchloride (III) must be carried out at temperatures below about 50° C. in order to avoid reaction of the alcohol (II) with the sulfonylhalide group thereby giving rise to undesired by-products.

If desired, the reaction of alcohol (II) and isocyanatosulfonyl chloride (III) can be carried out in the presence of a catalyst. Illustrative of catalysts are those readily obtainable and conventionally used in like procedures, such as, for example, the tertiary organic amines which include triethylamine, triethylenediamine, N,N,N',N'-tetramethylethylenediamine, N,N,N',N' - tetraethylethylene diamine, N-methylmorpholine, N - ethylmorpholine, 1,1,3,3 - tetramethylguanidine, N,N,N',N' - tetramethyl-1,3-butanediamine, and the like. Completion of the reaction of alcohol and isocyanate is evidenced by cessation of exotherm or by disappearance of the N=C=O band stretching at $4.4\mu$ when infrared monitoring is available.

The relative molar proportions of the alcohol (II) and sulfonylchloride (III) employed in the above reaction will control the composition of the resulting carbamate (IV). Thus, if the reactants are employed in such molar proportions that the number of isocyanato groups in the isocyanatobenzenesulfonyl chloride (III) is exactly equivalent, on a molar equivalent basis, to the number of hydroxyl groups in the alcohol (II) the resulting carbamate (IV) will contain no free hydroxyl groups, i.e. $n=0$. As will be appreciated by one skilled in the art, appropriate adjustment of the molar proportions of the reactants (II) and (III) will convert a polyhydric alcohol (II; $n+m=2$ or more) into the corresponding compounds (I) in which one or more of the hydroxyl groups has been converted to the corresponding carbamate (IV). Of course, in the case of a monohydric starting alcohol (II; $n+m=1$) the only product of the reaction will be a monocarbamate (IV; $n=0$, $m=1$). In the case of the dihydric alcohol starting material, two products falling within Formula IV are possible, in the case of a trihydric alcohol three products are possible, and so on.

It will be apparent to one skilled in the art that, by reacting a polyhydric alcohol starting compound (II) with a proportion of isocyanatophenylsulfonyl chloride (III) sufficient to convert only one of, or less than all, the hydroxy groups, and reacting the product so obtained with a second, different isocyanatophenylsulfonyl chloride (III), there can be obtained the corresponding carbamate (IV) having differing carbamoyl moieties therein.

The product (IV) obtained by condensation of the alcohol (II) and the isocyanatophenylsulfonyl chloride (III) in any of the proportions and variations discussed above, can be isolated from the reaction mixture, if desired, before conversion to the desired azide (I). For example, the inert organic solvent can be removed by evaporation under such conditions of reduced pressure that the temperature, at which reaction of $SO_2Cl$ groups with any unreacted hydroxyl groups would take place, is not attained. Alternatively, the desired compound (IV) can be precipitated from the reaction mixture by addition of water or a second solvent in which the product is insoluble.

However, it is generally not necessary to isolate the compound (IV) prior to its conversion to the sulfonylazide (I) and, indeed, in most instances, the reaction product obtained in the reaction of alcohol (II) and isocyanatophenylsulfonyl chloride (III) can be employed without any further treatment in the final stage of the process set forth schematically above. Illustratively, the compound (IV), in solution in inert organic solvent obtained in the reaction described above and without any pretreatment, can be treated with the appropriate amount of sodium azide, i.e. 1 mole of sodium azide per $SO_2Cl$ group in the compound (IV). The reaction of the compound (IV) and the sodium azide is conducted at about 25° C. to about 100° C., preferably from about 25° C. to about 80° C. Sodium chloride is eliminated during the reaction and the progress of the latter can be followed by estimation of the amount of sodium chloride which has separated. The desired product (I) can be isolated from the reaction mixture by conventional procedures. For example, the precipitated sodium chloride can be removed from the reaction mixture by filtration and the filtrate evaporated to dryness. The product (I) so isolated can be purified, if desired, by conventional procedures such as recrystallization, chromatography and the like.

The isocyanatoarenesulfonyl chlorides (III) employed as starting materials in the synthesis of the compounds of the invention (I) are, for the most part, well-known and can be prepared by phosgenation of the corresponding aminobenzenesulfonic acids. Representative of the phosgenation procedures employed is that described by L. Alberino et al., Journal of Polymer Science, Pt. A–1, vol. 5, (1967), pp. 3212–13.

The starting aminobenzesulfonic acids required to prepare the isocyanato-compounds of Formula III are also, for the most part, known in the art, and can be prepared by methods well-known in the art. Illustratively, 4-aminotoluene sulfonic acid and 2-chlorosulfanilic acid are prepared by sulfonation of m-toluidine and m-chloroaniline, respectively [Veno and Tominaga, Bull. Tokyl Univ. Eng., 12; No. 1, pages 57–60 (1943)]. 4-amino-2,5-xylenesulfonic acid is a well-known compound, preparation of which was described as early as 1931 [Hunter and Sprung, J. Am. Chem. Soc. 53, 1432–43 (1931)]. A method for preparing 2,5-dichlor-4-aminobenzene sulfonic acid is described by Petitcolas and Sureau, Bull. Soc. Chem. France (1954) pages 986–90.5 5-aminobenzene-1,3-disulfonic acid can be prepared using methods well-known in the art such as reduction of 5-nitrobenzene-1,3-disulfonic acid. A method of preparing 5-nitrobenzene-1,3-disulfonic acid is described in Beilstein Handbuch der Organischen Chemie, fourth edition (1928), vol. II, page 202.

The aliphatic alcohols (II) employed in preparing the compounds of this invention are mono- or polyfunctional having 1 to 6 hydroxy groups and a molecular weight of less than 300. For the most part, they are well-known, as is their preparation. Representative examples are methanol, ethanol, n-propanol, isopropanol, n-butanol, sec-butanol, tert-butanol, pentanol, hexanol, octanol, decanol, dodecanol, stearyl alcohol, ethylene glycol, propylene glycol, butanediol, pentanediol, octanediol, butenediol, pentenediol, glycerol, erythritol, pentaerythritol, ribose, sucrose, sorbitol, glucose, mannitol, and like alcohols, including isomeric forms thereof.

The following examples describe the manner and process of making and using the invention and set forth the best mode contemplated by the inventors of carrying out the invention but are not to be construed as limiting.

EXAMPLE 1

To 50.4 gms. (0.8 mole) of ethylene glycol in 500 ml. of acetonitrile is added a solution of 43.2 gms. (0.2 mole) of 4-isocyanatobenzene sulfonyl chloride (prepared by the method of L. Alberino et al., supra.) The addition is accomplished over a period of 10 minutes with stirring and cooling at circa 2° C. to 8° C., and the mixture is then allowed to stand at room temperature until the NCO band stretching has disappeared in the infrared spectrum of an aliquot of the reaction mixture (approximately 30 minutes). To the mixture so obtained is added 13 gms. (0.2 mole) sodium azide and the resulting mixture is stirred for one hour at room temperature. The sodium chloride which has precipitated is removed by filtration and about 80 percent of solvent is evaporated from the filtrate under vacuum. Water is added to the remaining filtrate to precipitate the water insoluble product. The latter is separated by filtration, washed with water, and dried under vacuum at room temperature. There is thus obtained 52 gms. (91 percent theoretical yield) of a white crystalline powder identified by infrared and NMR spectrometric examination as 2-hydroxyethyl 4-azidosulfonylcarbonilate and having a melting point of 115° C. to 118° C. Recrystallization from acetonitrile gave white crystals having a melting point of 120° C. to 122° C. (Fisher-Johns method); 124° C. (DSC method).

Analysis.—Calculated $C_9H_{10}N_4O_5S$ (percent): C, 37.76; H, 3.46. Found (percent): C, 37.60, H, 3.73.

The above reaction is represented by the following equation:

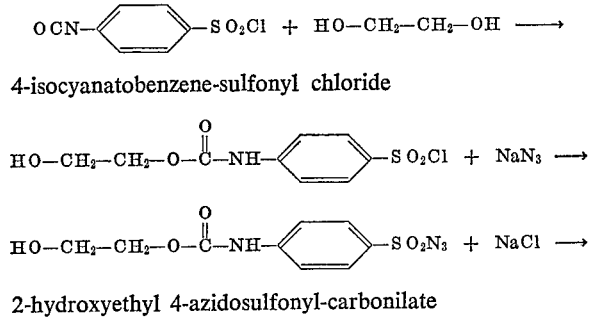

4-isocyanatobenzene-sulfonyl chloride 2-hydroxyethyl 4-azidosulfonyl-carbonilate In the same manner but substituting the same molar proportion of ethanol for the ethylene glycol, there is obtained ethyl 4-azidosulfonylcarbanilate.

EXAMPLE 2

To 3.1 gms. (0.05 moles) of ethylene glycol in 200 ml. of acetonitrile is added a solution of 21.75 gms. (0.1 mole) of p-isocyanatobenzenesulfonylchloride in 50 ml. acetonitrile. The addition is accomplished over a period of about 5 minutes with stirring and cooling at circa 3° C. to 6° C. The resulting mixture is allowed to stand overnight, and then heated to reflux temperature, at which time 6.5 gms. (0.1 mole) of sodium azide is added. The mixture so obtained is heated to 75° C. and then allowed to cool to 50° C. Sodium chloride precipitate (5.9 gms.) is filtered out. The filtrate is cooled and the solid which separates (5.6 gms.; melting point 168 to 172° C.) is isolated by filtration. Water is added to the cooled filtrate, yielding a further quantity (5.6 gms. of white crystals which are separated by filtration, washed and dried under vacuum. The total yield so obtained is 11.2 gms. (45.2 percent theory) of crude ethylene bis (4-azidosulfonyl carbanilate) in the form of white crystals having melting point 135° C. to 140° C. Upon recrystallization from acetonitrile, purified product with a melting point of 165° C. to 168° C. is obtained.

Analysis.—Calculated for $C_{16}H_{14}N_8O_8S_2$ (percent): C, 37.65; H, 2.75. Found (percent): C, 38.45; H, 2.82.

The above reaction is represented by the following equation:

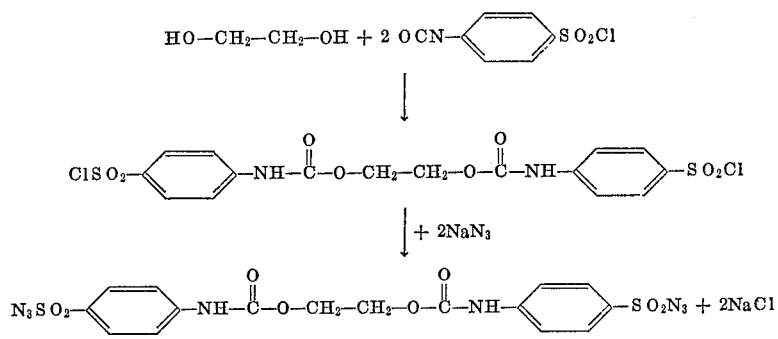

EXAMPLE 3

To 18.4 gms. (0.2 mole) of glycerol in 200 ml. of acetonitrile with stirring is added, dropwise, a solution of 10.87 gms. (0.05 mole) of p-isocyanatobenzenesulfonylchloride in 50 ml. of acetonitrile. The reaction is slightly exothermic, and the temperature rises from 21° C. to 26° C. After stirring the mixture for approximately 80 minutes, a total of 3.25 g. (0.05 mole) of sodium azide is added and the resulting mixture is stirred for 1 hour at room, temperature. The precipitated sodium chloride is filtered off and the solvent is evaporated from the filtrate. The residue is triturated in water and filtered twice, yielding, 11.35 gms. (72% theory) of white crystals having a melting point of 114 to 116° C. Recrystallization from acetonitrile gives 2,3-dihydroxypropyl 4-azidosulfonylcarbanilate in the form of white crystals with a melting point of 120 to 123° C., Analysis.—Calcd. for $C_{10}H_{12}N_4O_6S$ (percent): C, 37.97; H, 3.80. Found (percent): C, 37.69; H, 4.04.

The above reaction is represented by the following equation:

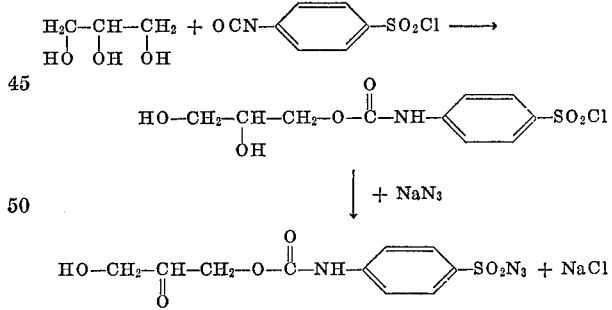

EXAMPLE 4

To 24 gms. (0.2 mole) of 1,1,1-trimethylolethane in 250 ml. of acetonitrile is added a solution of 10.87 gms. (0.05 mole) of p-isocyanatobenzenesulfonyl chloride in 50 ml. acetonitrile, with stirring, over a period of 5 minutes. After stirring the resulting mixture for 45 minutes at room temperature, a total of 3.25 gms. of (0.05 mole) of sodium azide is added with stirring, while ambient temperatures are maintained. After about one hour, the reaction is complete as evidenced by cessation of sodium chloride precipitation. The precipitated sodium chloride is separated by filtration, the filtrate is evaporated, to dryness and the residue is triturated with 40 ml. of acetonitrile, cooled and filtered. The filtrate solvent is evaporated to dryness in vacuo leaving 18.5 gms. of viscous liquid identified as 2,2-dimethylolpropyl 4-azidosulfonylcarbanilate.

Analysis.—Calcd. for: $C_{12}H_{14}N_4O_6S$ (percent): C, 45.53; H, 4.65. Found (percent): C, 45.88; H, 4.48.

The reaction is represented by the formula:

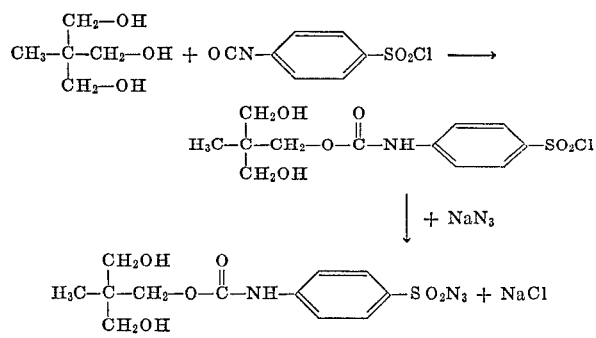

2,2-dimethylolpropyl 4-azidosulfonylcarbanilate

EXAMPLE 5

To 2.76 gms. (0.03 mole) of glycerol in 200 ml. of acetonitrile is added, over a period of 12 minutes, a solution of 19.57 gms. (0.09 mole) p-isocyanatobenzenesulfonyl chloride in 50 ml. acetonitrile. To the mixture, is added 0.05 gms. of triethylenediamine as catalyst. The resulting mixture is heated to reflux temperature (circa 80° C.) for about 3 hours and then 3 gms. of additional p-isocyanatobenzenesulfonyl chloride is added. The mixture is heated under reflux for an additional 3 hours and then cooled to room temperature. To the cooled mixture is added 7.15 gms. (0.11 mole) sodium azide and the resulting mixture is stirred for about 1 hour. The precipitated sodium chloride is separated by filtration. The solvent is evaporated from the filtrate and the residue triturated in concentrated hydrochloric acid. The resultant white crystals are isolated by filtration washed with water and dried, yielding 21.85 gms. (96.9% theory) of 1,2,3-propanetriyl tris (4-azidosulfonylcarbanilate) with melting point of 105 to 110° C.

The reaction is represented by the formula:

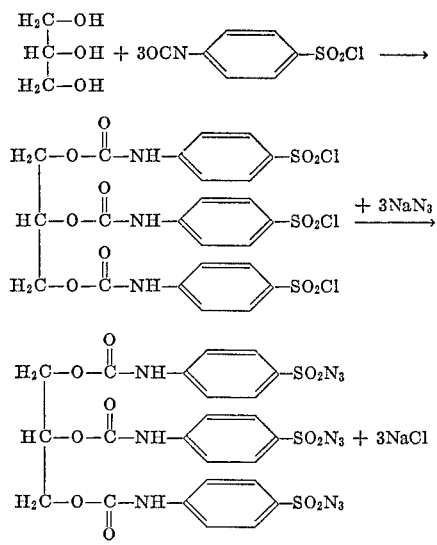

1,2,3-propanetriyl tris (4-azidosulfonylcarbanilate)

In a similar manner but substituting stoichiometric proportions of pentaerythritol, and mannitol respectively for the glycerol, there are obtained pentaerythritol tetra (4-azidosulfonylcarbanilate) and mannitol hexa (4-azidosulfonylcarbanilate) respectively.

EXAMPLE 6

Following the procedure set forth in Example 1, but replacing the p-isocyanatobenzenesulfonyl chloride by an equivalent amount of:

3-isocyanatobenzenesulfonyl chloride;
2-chloro-4-isocyanatobenzenesulfonyl chloride;
4-isocyanato-3-methylbenzenesulfonyl chloride;
2,5-dichloro-4-isocyanatobenzenesulfonyl chloride; and
5-isocyanatobenzene-1,3-di(sulfonyl chloride); there are obtained:
2-hydroxyethyl 3-azidosulfonylcarbanilate;
2-hydroxyethyl 2-chloro-4-azidosulfonylcarbanilate;
2-hydroxyethyl 3-methyl-4-azidosulfonylcarbanilate;
2-hydroxyethyl 2,5-dichloro-4-azidosulfonylcarbanilate; and
2-hydroxyethyl 3,5-diazidosulfonylcarbanilate respectively.

The 2-chloro-, 3-methyl, and 2,5 dichloro-4-isocyanatobenzenesulfonyl chlorides and the 5-isocyanatobenzene-1,3-di(sulfonyl chloride) employed in the above process are obtained by phosgenation of the corresponding known aminobenzenesulfonic acids using the procedure of Alberino, supra.

We claim:

1. A compound of the formula:

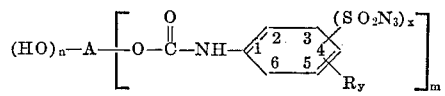

wherein A is the residue of an aliphatic alcohol having $(n+m)$ hydroxyl groups and a molecular weight of less than 300, $n$ is an integer from 0 to 5, $m$ is an integer from 1 to 6, provided that the sum of $n+m$ is not greater than 6, said aliphatic alcohol being selected from the group consisting of alkanols from 1 to 18 carbon atoms, inclusive, alkylene diols from 2 to 8 carbon atoms, inclusive, alkenylene diols from 4 to 5 carbon atoms, inclusive, glycerol, 1,1,1-trimethylolethane, erythritol, pentaerytritol, ribose, sucrose, sorbitol, glucose, and mannitol, R is selected from the class consisting of lower-alkyl and halogen, $x$ is an integer from 1 to 2, $y$ is an integer from 0 to 2, provided that the sum of $x+y$ is not greater than 3, the $SO_2N_3$ group is in any of positions 3, 4, or 5 in the phenyl nucleus to which it is attached, and at least one of the said positions 3, 4 and 5 is unsubstituted.

2. A compound according to claim 1 and corresponding to the formula:

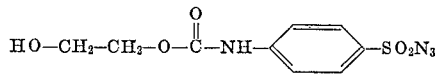

said compound being 2-hydroxyethyl 4-azidosulfonylcarbanilate.

3. A compound according to claim 1 and corresponding to the formula:

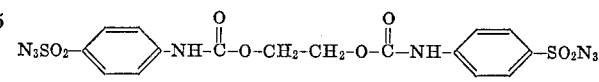

said compound being ethylene bis(4-azidosulfonylcarbanilate).

4. A compound according to claim 1 and corresponding to the formula:

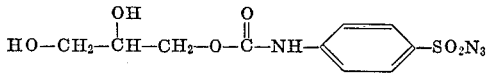

said compound being 2,3-dihydroxypropyl 4-azidosulfonylcarbanilate.

5. A compound according to claim 1 and having the formula:

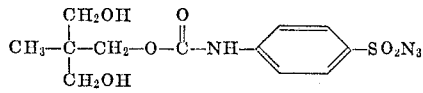

said compound being 2,2-dimethylolpropyl 4-azidosulfonylcarbanilate.
6. A compound according to claim 1 and corresponding to the formula:
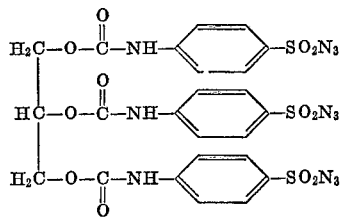
said compound being 1,2,3-propanetriyl tris (4-azidosulfonylcarbanilate).
References Cited
UNITED STATES PATENTS
| | | |
|---|---|---|
| 2,680,120 | 6/1954 | Gregory _____ 260—349 |
| 3,261,785 | 7/1966 | Robinson _____ 260—349 |
| 3,298,975 | 1/1967 | Feild et al. _____ 260—349 X |
| 3,462,268 | 8/1969 | Danhauser et al. ___ 260—349 X |
JOHN M. FORD, Primary Examiner
U.S. Cl. X.R.
260—77.5 AP, 94.6